Patented Jan. 31, 1950

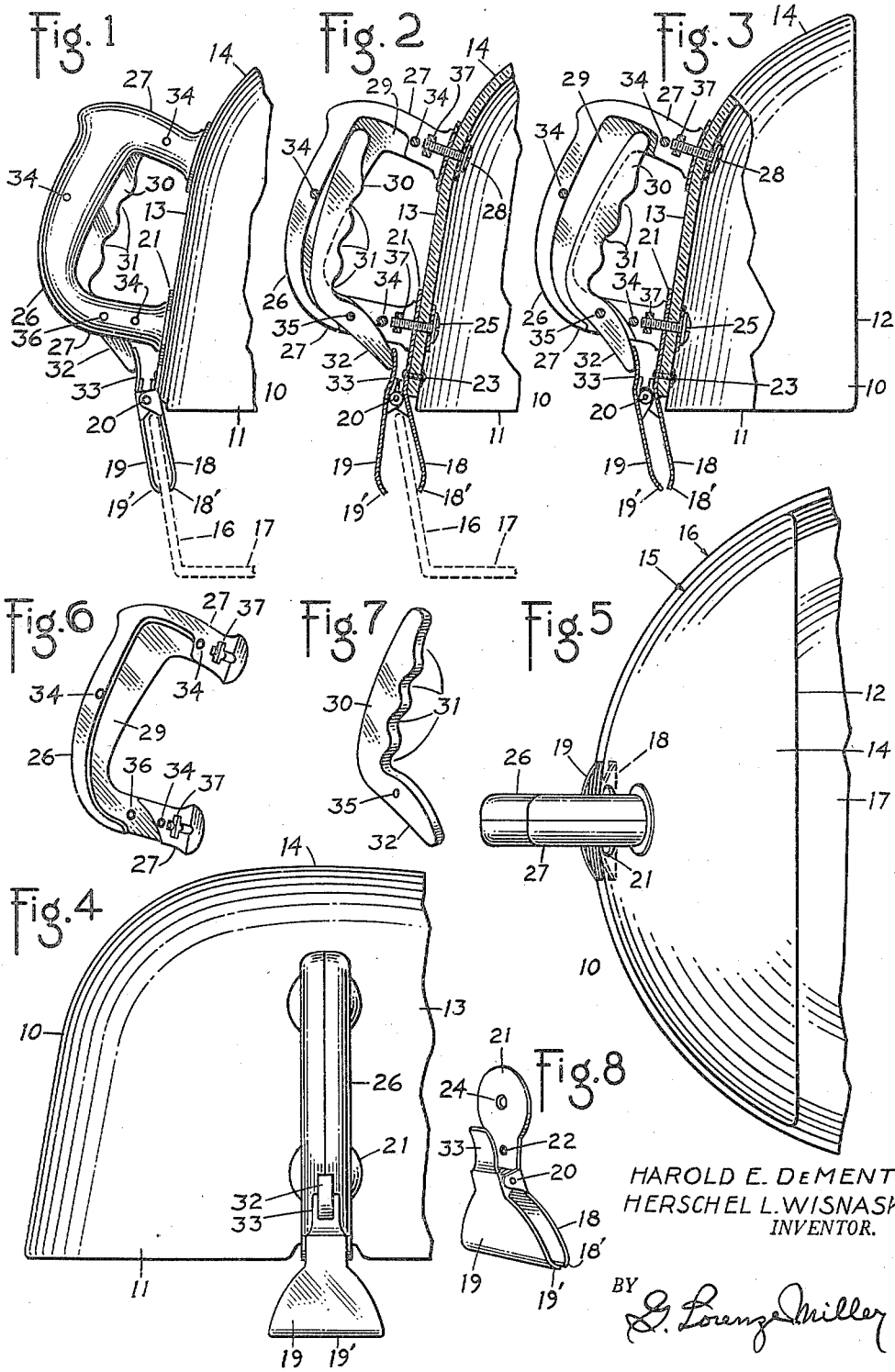

2,496,121

UNITED STATES PATENT OFFICE 2,496,121

GREASE SHIELD FOR SKILLETS AND THE LIKE

Harold E. De Ment, Decatur, and Herschel L. Wisnasky, Forsyth, Ill.

Application August 13, 1948, Serial No. 44,003

2 Claims. (Cl. 220—85)

This invention relates to a grease shield for skillets and the like.

The device has to do with means for protecting a housewife, or the one doing the cooking, from the usual spattering of grease from skillets and other cooking utensils as frequently occurs during the frying of foods.

It is well known that in frying eggs and certain kinds of meat in particular, grease spatters up out of the pan or utensil onto the hands and many times upon the face of the one doing the cooking, thereby creating not only annoyance but a hazard resulting in burns, sometimes of a serious nature, as well as staining the clothing.

The present invention, therefore, is made to provide against the above stated disadvantages. It consists in the provision of a shield of such proportions and contour as will fit amply around and overhang somewhat the adjacent edge portion of the utensil, acting as a guard or stop element against which the grease spatters and runs down and back harmlessly into the utensil.

In the accompanying drawings there is illustrated a practical but non-limiting exemplification of the invention, which is described in detail in the following specification and afterwards set forth in particularity in the appended claims.

In the drawings:

Figure 1 is a fragmentary side elevation showing, in full lines, the device as mounted on the edge portion of a skillet or cooking utensil a fragment of which is indicated in dotted lines;

Figure 2 is a similar fragmentary view but with the showing of the shield parts in section and partial elevation, with the near half of the handle removed and the clamp part of the device opened as for placing it upon and removing it from the utensil;

Figure 3 is a fuller and more complete view of the device in side elevation and the clamp part in its normal closed position as when the device is detached from the skillet or cooking utensil, with the near half of the handle removed to show, in normal position, the lever element that is operated in use to open the clamp part as indicated in Figure 2;

Figure 4 is a front elevational view of the device as detached from the skillet or cooking utensil, a portion of the shield body to the right of the handle being broken off and removed to foreshorten the view;

Figure 5 is a full top plan view of the device, shown as applied to the utensil, with some of the utensil broken off and removed to foreshorten the view as is done in Figure 4;

Figure 6 is an inside view of the far half of the handle of the device with the near half removed;

Figure 7 is a perspective view of the lever element detached; and

Figure 8 is a perspective view of the clamp part of the device alone.

Referring now to the drawings in detail, the numeral 10 designates the body shell part of the device which may be made of any suitable and desired material. It is preferably made of a characteristic plastic material, either transparent or opaque, and of attractive color selections. This is the ideal and preferred material, because of its desirable light weight along with ample rigidity and strength, and also for its water resistant and non-porous hardness. That is to say, it will not absorb grease and its surface is easily kept clean and in a sanitary condition. The material is also especially desirable for use, in that it is of comparatively low heat absorption and conductivity.

The body shell 10 may be made in different standard sizes, but not necessarily in excessive number, as each determined size shell may, in accordance with the means provided for its attachment in use, be effectively applied to different sized skillets or cooking utensils. So, too, the shell may be made in different specific forms to suit different shaped utensils, that is, utensils of either a round or a substantially square shape. For example, the shell of the shield device may be formed with some appreciable curvature or it may obviously be straight and flat-walled. However, in practice and for general use, the shell 10 may be made in substantially the form shown in the drawings.

As shown (see Figures 3, 4 and 5 for clarity) the shell 10 is somewhat hood-like but segmental in form instead of being full circular and cover-like. That is, it is open at the bottom 11 and chord-wise across one vertical side 12 thereof. Thus, while it is open at the bottom and at one side (the inner side) the shell is semi-hooded. In other words, it has an upstanding grease-spatter-obstructing side wall portion 13 of appreciable proportions and also an inwardly overhanging top wall portion 14 also of substantially effective size.

It is here noted that the side wall portion 13 and the overhanging top portion 14, while not extending entirely around and entirely over the skillet or cooking utensil, if the device is placed on the utensil at the side between where the one doing the cooking stands (as should be the case) the person is well protected from the spattering grease.

It is further noted that, in practice, the curvature 15 annularly at the bottom edge of the upstanding wall 13 (see Figure 5 of the drawing for illustration) is approximately exactly the same as the curvature at the top edge of the wall 16 of a skillet or cooking utensil 17 of a given size. In this way, the shield device of the present invention may be applied effectively to not only that particular size of utensil but also to one of appreciably larger or smaller diameter, in which latter case, of course, the edge of the wall 13 of the shield device will be eccentric and not concentric with the edge of the utensil wall 16. In other words, the extent of the shield wall will be either inside or outside of the wall of utensil, yet the device is still of good shielding effect.

Of course, if the shield wall is straight and not curved as shown, then the relative position of the applied shield with respect to the utensil wall is the same in all sizes of square utensils; and, in this connection, it may be here noted, that while the shield may, if so desired, be made straight-walled, it may, for practical general purposes, be made only in the curved form, as it will, in this form, be attachable to either a round or square utensil. In either case, the body shell is an effective guard to obstruct the path of spattering and popping grease towards the one doing the cooking if the device is placed on the utensil between it and such person.

The body shell 10 of the shield may be mounted detachably on the cooking utensil in any suitable manner. Preferably, as indicated in the drawings, the attaching means includes a normally self-closing spring clamp element comprising a stationary jaw member 18 and an opposed hinged member 19 which is pivotally mounted on said stationary member 18, as at 20. Any obvious spring means (not shown, because obvious) may be provided for closing the clamp jaw 19 relatively to the stationary jaw 18 and for yieldably holding it normally in closed position, which position is illustrated in Figure 3.

The two jaws 18 and 19, as shown more clearly in Figure 8, are flared or widened downwardly, or, in other words, they are substantially fan-shaped, and their bottom edges are turned inwardly toward each other, as at 18', 19' (see Figures 1, 2 and 3, for clarity). These inturned edge portions grasp the wall or flange 16 of the skillet or cooking utensil 17 when the shield is applied as indicated in Figure 1. Suffice it to here note that whatever spring means is provided for closing and holding the clamp closed, the same must, obviously, be strong enough to hold the clamp sufficiently effective for supporting the shield body 10 when applied to the utensil.

As shown (see Figure 8) the stationary clamp member 18 is provided with an apertured ear extension 21 by which it is to be attached to the shield body 10. One of the apertures, as that 22 being the smaller in diameter for the reception of a rivet 23 which is a part of the means for fastening the clamp member 18 to the shield body. The other and larger aperture 24 of the ear 21 is provided to receive, as an additional fastening means, a bolt 25 which is also used to fasten one end portion of a handle element 26 to the shield body 10 as indicated in Figures 2 and 3.

As shown, the handle 26 is made in two separable, matching half-sections, which are hollowed out, as at 29, (see Figures 2, 3 and 6) to produce, when the handle is assembled, a pocket in which a lever element 30 is received, and said pocket having a slotted opening at the inner side of its hand-grasp portion. Through this slotted opening the finger-notched inner longitudinal edge portion 31 of said lever 30 normally projects (see Figures 1 and 3) and an angular lower end portion 32 of the lever is just contiguous to a curvedly recessed operating lever arm 33 of the hinged clamp member 19 when said clamp member 19 is in closed relation to the stationary clamp member 18 (for this showing also see Figures 1 and 3). That is to say, normally, the angular end 32 of the lever 30 is closed to but does not press forcibly against said lever arm 33 of the clamp member 19 nor tend to open said member 19. However, if the handle portion 26 is held in the hand and fingers of the hand are pressed forcibly against the notched edge portion 31 of said lever element 30, the lever element is swung back into the pocket 29 of the handle and the angular end 32 of said lever element bears forcibly on said lever arm 33 and forces the clamp member 19 to open position as shown in Figure 2 of the drawings.

With the clamp member 19 open as indicated in Figure 2, the shield device is easily applicable to and removable from the cooking utensil wall or flange 16.

As indicated in the drawings, rivets, screws, bolts or the like are insertable at apertured points 34 to fasten the two matching half-sections 26 of the handle together, and the lever element is pivotally mountable at a point 35 thereon by a pivot stud, bolt or the like which is also inserted through an apertured portion of the handle at the point 36.

For fastening the handle 26 to the body shell 10 of the shield device, the handle end extensions 27 may be provided with specially formed matching recesses 37 in the meeting faces of the two half-sections to receive and hold nut elements or the like, into which the fastening bolts 25 and 28 are screwed when the handle is applied to the shield body.

From the foregoing description it is apparent that an effective grease shield device is produced for the particular use intended, and while the structure shown is of practical character the same is not in specific limitation of the invention, as modification and change is possible and even contemplated within the scope of the appended claims.

What is claimed is:

1. A grease shield device comprising a shielding body portion proper and means for mounting said body portion detachably supported on the side wall of a cooking utensil such as a skillet or the like, said mounting means comprising a clamp element including a stationary member fastened supportedly to and depending from the lower portion of said shielding body, an opposed clamp member hinged to said stationary member with some conventional means for normally self-moving said hinged member towards and yieldably holding it in closed relation to said stationary member, a handle element secured on said shielding body, and an actuator element mounted on said handle element in cooperative relation to said hinged clamp element for moving the same to an opened position relative to said stationary clamp member.

2. A grease shield device as set forth in claim 1, wherein a part of the means for securing the handle element to the shielding body is also used to fasten the stationary clamp member to the body.

HAROLD E. DE MENT.
HERSCHEL L. WISNASKY.

REFERENCES CITED

The following references are of record in the file of this patent:

UNITED STATES PATENTS

| Number | Name | Date |
|---|---|---|
| 411,483 | Wright | Sept. 24, 1889 |
| 421,807 | Batsford | Feb. 18, 1890 |
| 498,569 | Peterson | May 30, 1893 |
| 2,148,181 | Andreolo | Feb. 21, 1939 |